United States Patent [19]

Uehara et al.

[11] Patent Number: 4,989,814
[45] Date of Patent: Feb. 5, 1991

[54] COUNTER-BALANCING MECHANISM FOR CAMERA UNIVERSAL HEAD

[75] Inventors: Ken-ichi Uehara, Kawagoe; Hisashi Tomioka, Asaka, both of Japan

[73] Assignee: Daiwa Corporation, Tokyo, Japan

[21] Appl. No.: 525,586

[22] Filed: May 21, 1990

[30] Foreign Application Priority Data

Jun. 7, 1989 [JP] Japan .................................. 1-65835

[51] Int. Cl.⁵ ............................................. F16M 11/10
[52] U.S. Cl. ................................. 248/185; 248/292.1; 248/596
[58] Field of Search ............... 248/184, 180, 185, 186, 248/183, 292.1, 596, 280.1, 571, 584, 592, 594, 575, 578; 74/44, 55, 567, 569; 354/293; 188/271

[56] References Cited

U.S. PATENT DOCUMENTS

| | | | |
|---|---|---|---|
| 2,998,953 | 9/1961 | O'Connor | 248/183 |
| 4,083,524 | 4/1978 | O'Connor | 248/183 |
| 4,533,103 | 8/1985 | Ina | 248/180 X |
| 4,653,709 | 3/1987 | Paldino | 354/293 |
| 4,726,253 | 2/1988 | Russell | 74/569 |
| 4,732,357 | 3/1988 | Lindsay | 248/185 |
| 4,771,979 | 9/1988 | Nakazawa et al. | 248/185 X |
| 4,919,376 | 4/1990 | Uehara et al. | |

FOREIGN PATENT DOCUMENTS 2049601 12/1980 United Kingdom .

Primary Examiner—Ramon O. Ramirez
Attorney, Agent, or Firm—Armstrong, Nikaido, Marmelstein, Kubovcik and Murray

[57] ABSTRACT

This invention relates to a universal head to vertically swing a camera, and, in particular, to a counter-balancing mechanism for counter-balancing the rotative moment arising from the displacement of the bravity center of the camera. The mechanism comprises a cam surface and a roller in a suppressing contact with each other; and said cam surface is formed on one side of the camera mounting table and, rapid free rotation of the camera mounting table is prevented by suppressing the roller contacting with cam surface upon that cam surface; the cam changes the place of contact between the cam and roller in cooperation with the roller as the camera mounting table rotates in order to enhance forces for preventing the rotation of that table.

1 Claim, 2 Drawing Sheets

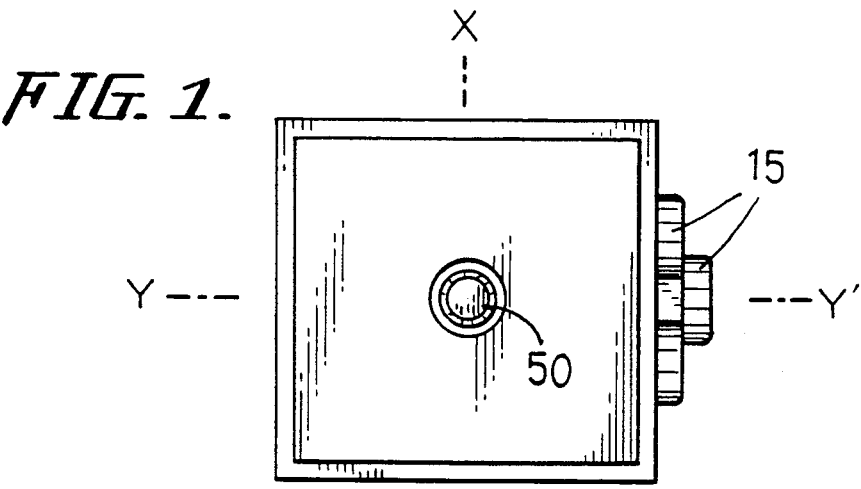
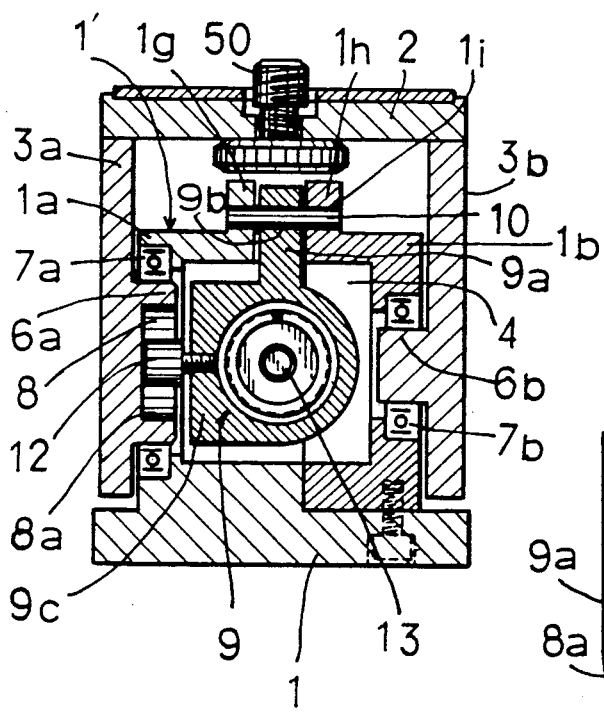
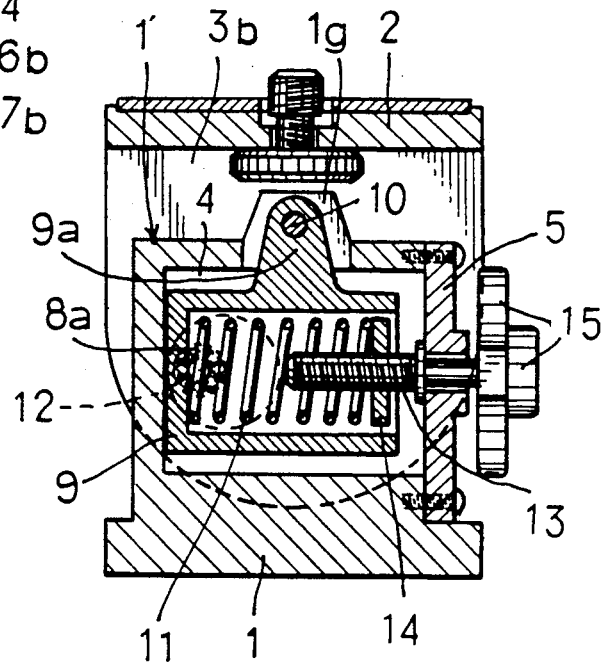

COUNTER-BALANCING MECHANISM FOR CAMERA UNIVERSAL HEAD

BACKGROUND OF THE INVENTION

The present invention relates to a universal head for rotating vertically (tilting) in both direction the Camera, e.g. a video camera, cinematograph camera unit, and, in particular, to a counter-balancing mechanism for practically balancing rotative moments caused by the movement of the gravity center of the unit by the weight of said camera.

When a camera set on a camera mounting table is rotated (tilted) downwards, it is tilted so rapidly by the rotative moment like the free fall thereof. To prevent this and facilitate such a tilting operation, it is desirable to provide a counter-balance on the camera mounting support.

So far there have been encountered some cases where because of rollers lying transversely in a box-like space above the base support, these counter-balancing mechanism have some limitations on the length of a spring for such a balancing; and therefore a large-size of the unit has been imperative to achieve a perfect balancing. In addition, there has occurred a need to use expensive needle bearings for supporting spring receiving seats.

SUMMARY OF THE INVENTION

The purpose of the present invention is to provide a counter-balancing mechanism for a camera universal head, wherein the whole unit can be formed in a small size without using needle bearing and a perfect counter-balancing can be effected.

The objective of the invention will be achieved by a counter-balancing mechanism to act against vertical (tilting) rotative moment of a camera mounting table in a camera universal head with said camera mounting table mounted vertically rotative (tiltable) on a laterally rotative (swingable) base support, wherein, a housing having been fixed on said base support and having an open side is provided; and bearings are respectively fitted on bearing fitting holes on two opposite sides other than said open sides; and axial pieces (dowel pins) are protruded from the inner surfaces of both side plates of said camera mounting table to be a center of said rotation (tilting) by being inserted into said bearings; and a roller for contacting on a concave cam formed on the end of one said axial piece of the one of said side plates are fixed on a spring receiving seat suspended free to make rocking motions within said housing; and a spring in a suppressing contact with said roller upon said concave cam is accommodated within said spring receiving seat.

BRIEF DESCRIPTION OF THE DRAWINGS

FIG. 1 is plan view of a camera universal head provided with a counter-balancing mechanism in accordance with the present invention, FIG. 2 a sectional view along the line X—X' in FIG. 1, FIG. 3 another sectional view along the line Y—Y' in FIG. 2, and FIG. 4 an exploded assembly drawing thereof.

DETAILED DESCRIPTION OF THE PREFERRED EMBODIMENT

Figure 4:
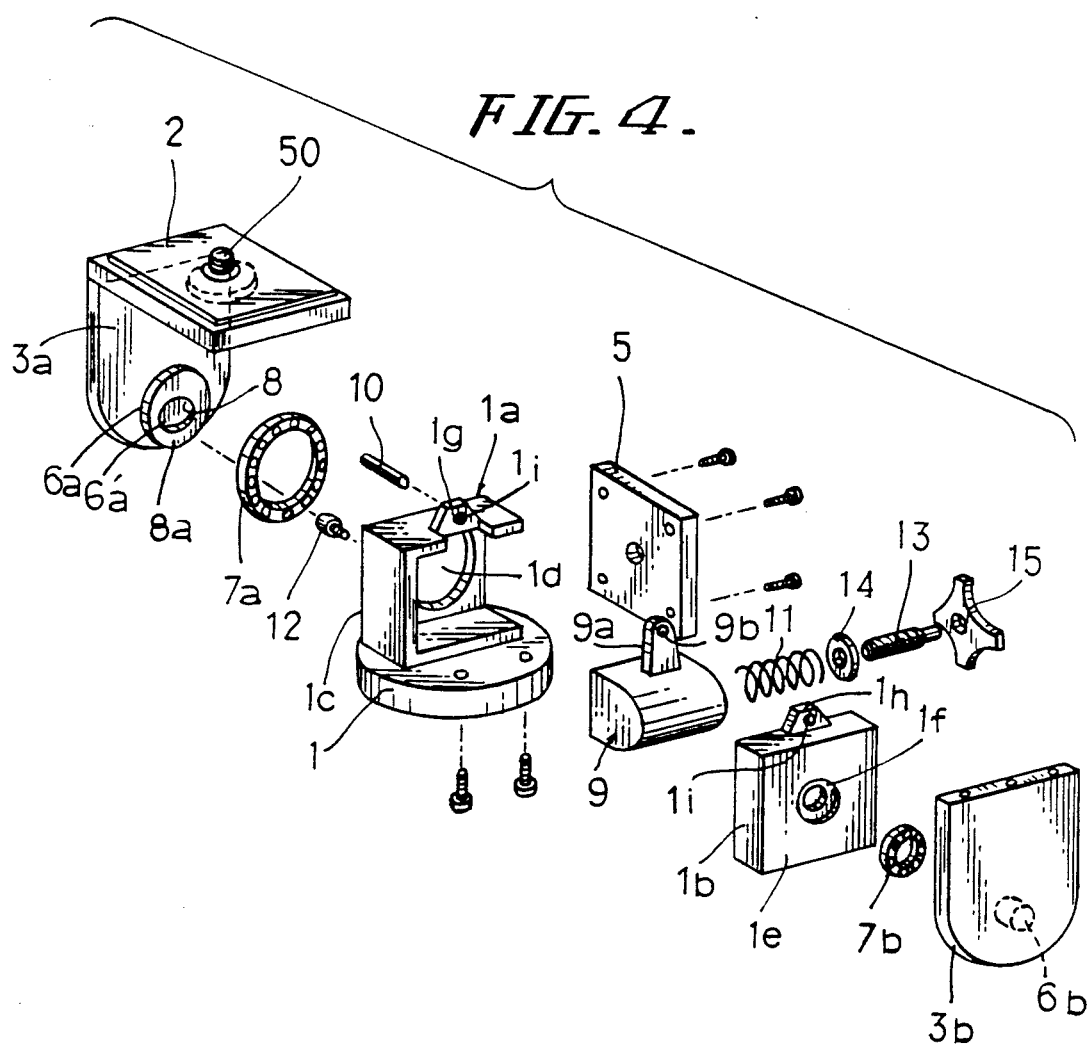

In the drawing the numeral 1 denotes a laterally rotative (swingable) base support (1) on which a camera mounting table (2) is vertically rotatively (tiltably) mounted.

The camera mounting table (2) is approximately of a square, and is provided with a screw to fix a camera approximately at the center of the table (2). And side plates (3a) and (3b) are fixedly secured on two opposite sides of the table. Axial pieces (6a) and (6b) are protrudingly provided on the opposite surfaces of the side plates (3a) and (3b) to be the center of the vertical rotation (tilting) and the one axial piece (6a) is made larger than the other on (6b) so as to form a concave cam 8 on its end. The camera mounting table (2) is installed on the base support (1) so as to tilt or rotate vertically, and said housing (1') is mounted bridgingly on the base support (1). The housing (1') is of a square box-like shape with one open side, and, as shown in FIG. 4, has a left section (1a) and right section (1b), and a bearing fitting hole (1d) is bared on the front face (1c) of the left section (1a), into which hole a bearing (7a) is inserted so as to journal the axial piece (6a). Another bearing fitting hole (1f) is also bared on the side surface (1e) of the right section (1b) into which hole the bearing (7b) is fitted, and the axial piece (6b) is rotatively inserted into the bearing (7b).

The left and right section (1a) and (1b) of the housing (1') has on their top surface integral protruding parts (1g) and (1h) with a through hole (1i) respectively. The numeral (9) is a spring receiving seat accommodated within the inner space (4) of the housing (1') and the spring receiving seat (9) is suspended free to make rocking motions by aligning the hole (9b) of a rocking piece (9a) provided protrudingly on the top surface of the seat (9) with holes (1i) of the protruding piece (1g) and (1h) in order to insert a shaft (10) through these three holes. The spring receiving seat (9) is of an arc shape in its one side and forms a vertical plane (9c) in its other side, and accommodates a coil spring (11) within; and a regulating piece (14) to retain the coil spring (11) is threaded into a regulating screw (13) which is also screwed into a cover plate (5) to close the open side of the housing (1'), and slides forwards or rearwards to regulate the suppressing pressure of the coil spring (11) when rotating a handle (15) at the base of the regulating screw (13).

The roller (12) is in a suppressing contact with a cam surface (8a) via the spring receiving seat (9) by the coil spring (11). The camera mounting table (2) is therefore prevented from free rotation (tilting), and, when a rotative motion (tilting) is attempted, the cam (8) displaces together with to change the position of contact with the roller (12) and raise the contact pressure by the coil spring (11). The camera mounting table (2) becomes harder to be rotated, that is, a counter-balancing function is produced.

In a mechanism in accordance with the present invention as shown in the above, a spring receiving seat is provided to be free to make rocking motions within a housing, within which are provided a roller in suppressing contact with a cam varying its position with the rotation of the table, and the cam and roller can effect an adequate counter-balancing function.

What is claimed is:

1. A counter-balancing mechanism to act against vertical rotative moment of a camera mounting table in a camera universal head with said camera mounting table mounted vertically rotatively on a laterally rotative base support, wherein, a housing having been fixed on said base support and having an open side is provided; and respective bearings are fitted into bearing fitting holes on two opposite sides other than said open side; and axial pieces are protruded from the inner surfaces of both side plates of said camera mounting table to be a center of said vertical rotation by being inserted into said bearings; and a roller for contacting on a concave cam formed on the end of one of said axial pieces of the one of said side plates is fixed on a spring receiving seat suspended free to make rocking motions within said housing; and a spring to suppressingly contact said roller upon said concave cam is accommodated within said spring receiving seat.

* * * * *